(12) United States Patent
Sakairi

(10) Patent No.: US 8,763,839 B2
(45) Date of Patent: Jul. 1, 2014

(54) BAND COUPLING AND PRESSURE CONTAINER WITH SAME

(75) Inventor: Shigemitsu Sakairi, Tsukubamirai (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/502,762

(22) PCT Filed: Oct. 22, 2009

(86) PCT No.: PCT/JP2009/068195
§ 371 (c)(1),
(2), (4) Date: Apr. 19, 2012

(87) PCT Pub. No.: WO2011/048686
PCT Pub. Date: Apr. 28, 2011

(65) Prior Publication Data
US 2012/0205379 A1    Aug. 16, 2012

(51) Int. Cl.
*B65D 45/32*    (2006.01)
(52) U.S. Cl.
USPC .......................... 220/320; 220/321; 292/256.6
(58) Field of Classification Search
USPC ............... 220/320, 321, 322, 319; 292/256.6, 292/256.67, 256.75, 256.69; 285/409, 407, 285/410, 411, 367, 408; 24/279, 285, 271, 24/514
See application file for complete search history.

(56) References Cited

U.S. PATENT DOCUMENTS

| | | | | |
|---|---|---|---|---|
| 1,547,048 A | * | 7/1925 | Klein | 292/206 |
| 1,901,699 A | * | 3/1933 | Burpee | 292/256.67 |
| 4,415,190 A | * | 11/1983 | Finck et al. | 292/256.6 |
| 5,193,864 A | * | 3/1993 | Coleman | 292/256.67 |

FOREIGN PATENT DOCUMENTS

| | | |
|---|---|---|
| CA | 1039974 | 10/1978 |
| JP | 56 500024 | 1/1981 |
| JP | 62 52060 | 3/1987 |
| JP | 6 40519 | 5/1994 |
| JP | 7 23415 | 5/1995 |
| JP | 11 255256 | 9/1999 |
| JP | 2004 276979 | 10/2004 |

OTHER PUBLICATIONS

International Search Report Issued Feb. 2, 2010 in PCT/JP09/68195 Filed Oct. 22, 2009.
Chinese Office Action issued Feb. 19, 2014, in Chinese Patent Application No. 200980162063.4, pp. 1-13.

* cited by examiner

Primary Examiner — Jeffrey Allen
(74) Attorney, Agent, or Firm — Oblon, Spivak, McClelland, Maier & Neustadt, L.L.P.

(57) ABSTRACT

A pressure container is provided with a container body, a container lid, and a band coupling. The band coupling is provided with a retainer capable of engaging with the outer peripheries of a first flange section and a second flange section, and also with a tightening mechanism for tightening the retainer. The retainer has a first end section forming one end to which the tightening mechanism is connected, and also has a second end section forming the other end which is bent outward and faces the first end section when the retainer is tightened. The tightening mechanism is provided with a stopper rotatably mounted to the first end section of the retainer, and also with a pressing bolt engaged through thread with the stopper so as to be able to advance and recede and pressing the second end section to the first end section side with the retainer engaged with the first flange section and the second flange section. A projection section which is caught by the pressing bolt when the pressing bolt presses the second end section is provided to the second end section.

6 Claims, 11 Drawing Sheets

BAND COUPLING AND PRESSURE CONTAINER WITH SAME

TECHNICAL FIELD

The present invention relates to a band coupling for suitably coupling a container body and a container lid of a pressure container, as well as to a pressure container equipped with such a band coupling.

BACKGROUND ART

Heretofore, a band coupling has generally been used for coupling a container body and a container lid of a pressure container (see, for example, Japanese Laid-Open Patent Publication No. 11-255256). Also, band couplings, which are configured to enable a detachment operation to be performed easily and stably, have been proposed, for example, in Japanese Utility Model Publication No. 07-023415 and Japanese Laid-Open Patent Publication No. 2004-276979.

The band couplings proposed in Japanese Utility Model Publication No. 07-023415 and Japanese Laid-Open Patent Publication No. 2004-276979 are made up from a metallic annular retainer having a V-shaped groove, a metallic flexible band that is attached to an outer periphery of the retainer, and a tightening mechanism for tightening the flexible band. Therefore, the container body and the container lid are joined together using the retainer to clamp outer peripheries of respective flange sections of the container body and the container lid, which are placed in mutual abutment with each other, and then tightening the band by the tightening mechanism.

SUMMARY OF INVENTION

Although the band couplings proposed in Japanese Utility Model Publication No. 07-023415 and Japanese Laid-Open Patent Publication No. 2004-276979 enable the attachment and detachment operations to be carried out easily and stably, further improvements are still desirable for enhancing facility of handling and ease of use.

The present invention has been made while taking into consideration the points noted above, and has the object of providing a band coupling that enables attachment and detachment operations to be performed easily and safely, as well as a pressure container equipped with such a band coupling.

For realizing the aforementioned object, the present invention is characterized by a band coupling for mutually coupling a container body having a first flange section and a container lid having a second flange section by clamping together outer peripheries of the first flange section and the second flange section, comprising a retainer capable of surrounding substantially once around the outer peripheries of the first flange section and the second flange section, and of being fitted together with the first flange section and the second flange section, and a tightening mechanism for tightening the retainer. The retainer further comprises a first end section of one end to which the tightening mechanism is connected, and a second end section of another end, which is bent outward and opposes the first end section when the retainer is tightened. The tightening mechanism further comprises a stopper that is attached rotatably to the first end section of the retainer, and a pressing bolt that is screw-engaged with the stopper so as to be capable of advancing and retracting, and which presses the second end section toward a side of the first end section in a state in which the retainer is fitted to the first flange section and the second flange section, wherein a projection, which is caught on the pressing bolt when the pressing bolt presses the second end section, is provided on the second end section.

According to the present invention, which is configured in the foregoing manner, even if the pressing bolt is loosened to a midway position, because the pressing bold remains caught on the projection, the pressing bolt cannot be separated from the second end section connected to the pressing bolt until the pressing bolt has been completely loosened. In addition, at a stage in which the pressing bolt is completely loosened, the airtight state between the container body and the container lid is released, and a state occurs in which the internal pressure in the container escapes. Therefore, rising up of the container lid, or falling off of the band coupling at an unintended timing, can be prevented. Accordingly, a band coupling can be provided in which handling thereof is facilitated, and ease of use is further improved.

Further, in the aforementioned band coupling, the projection is a hollow tubular member.

In this manner, by using a hollow tubular member as the projection, the projection can be formed having sufficient strength by means of a simple structure.

Further, in the aforementioned band coupling, the retainer includes plural arcuate retainer segments, and a connecting member for rotatably connecting together respective ends of the plural arcuate retainer segments.

In accordance with the foregoing structure, connecting members of each of the retainer segments are connected together rotatably, and therefore, the retainer can easily be widened or made narrower with a small force. Thus, handling when the retainer is installed on or removed from the container can be facilitated, and ease of use can be improved.

Further, in the aforementioned band coupling, the connecting member includes stopper members that regulate a range of rotation of the retainer segments.

In accordance with the foregoing structure, by regulating the range of rotation of the retainer segments using the stopper members, the retainer cannot be opened excessively. Consequently, handling can be better facilitated, and ease of use can be improved.

Further, in the aforementioned band coupling, the stopper members are disposed so as to cover ends of the retainer segments.

In accordance with the foregoing structure, by means of the stopper members, because gaps formed between the connecting members and ends of the retainer segments are made narrow, penetration of the user's fingers into such gaps can be prevented, and thus the user can handle the band coupling safely.

Further, in the aforementioned band coupling, each of the retainer segments includes an arcuate portion having a fitting groove that is fitted onto the first flange section and the second flange section and which extends in an arcuate shape, and projecting end portions, which are bent outwardly and project from both ends of the arcuate portion.

According to the above structure, because the projecting end portions are not in contact with the first flange section and the second flange section, and are not subjected to loads directly from the first flange section and the second flange section, cracking due to fatigue does not occur. Owing thereto, even if some cracking due to fatigue occurs provisionally in the arcuate section, because the location at which cracking occurs is not at the ends of the retainer segments, such cracking does not progress. Thus, strength can be enhanced, the band coupling can be made more thin-walled, and manufacturing costs can be reduced. Further, due to a reduction in weight, handling of the band coupling is facilitated, and ease of use is further improved.

The present invention further is characterized by a pressure container equipped with a container body having a first flange section, a container lid having a second flange section, and the above-described band coupling.

DESCRIPTION OF EMBODIMENTS

Below, preferred embodiments of the present invention will be described with reference to the accompanying drawings.

Figure 1:
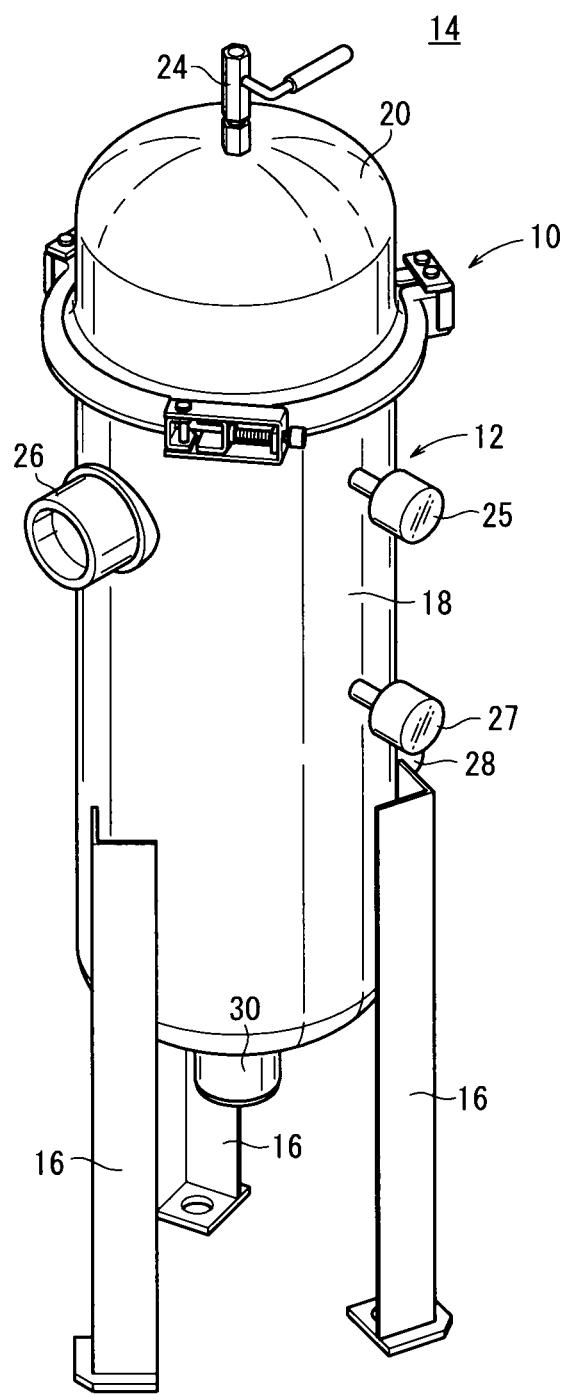
FIG. 1 is an overall perspective view of a filter as an example of a pressure container on which a band coupling according to an embodiment of the present invention is installed.
Figure 2:
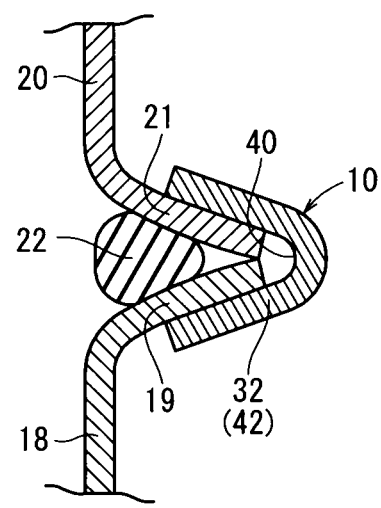
FIG. 2 is a cross sectional view with partial omission showing the band coupling and surrounding vicinity at a time when the band coupling according to the embodiment of the present invention is installed on the pressure container.

FIG. 1 is an overall perspective view of a filter 14 equipped with a container (pressure container) 12 on which a band coupling 10 according to an embodiment of the present invention is installed. FIG. 2 is a cross sectional view with partial omission showing the band coupling 10 and the surrounding vicinity thereof at a time when the band coupling 10 is installed on the container 12. The filter 14 includes a function to filter and discharge a liquid that flows therein by means of a built-in filter element. However, the applied example of the container 12 is not limited to a filter 14, but may also be, e.g., a heat treatment apparatus, a boiler, or the like.

As shown in FIG. 1, the filter 14 includes the container 12 in which a non-illustrated filter element is incorporated, and a plurality of legs 16 attached to a lower portion of the container 12 for supporting the container 12 in an upstanding condition.

The container 12 is equipped with a cylindrical container body 18 with an open upper end, a dome-shaped container lid 20 that closes and hermetically seals the upper end opening of the container body 18, and the band coupling 10 that couples or joins the container body 18 and the container lid 20. As shown in FIG. 2, a first flange section 19 that bulges radially outward on the upper end of the container body 18 is formed around the entire circumference thereof, and a second flange section 21 that bulges radially outward on a lower end of the container lid 20 is formed around the entire circumference thereof.

With the structural example shown in FIG. 2, the first flange section 19 exhibits a flare shape that widens upwardly, whereas the second flange section 21 exhibits a flare shape that widens downwardly. However, the mutually opposing surfaces of the first flange section 19 and the second flange section 21 may also be formed as perpendicular surfaces with respect to the axis of the container 12.

As shown in FIG. 2, an o-ring 22, which serves as an annular sealing member, is interposed between the container lid 20 and the container body 18. The sealing member that is interposed between the container lid 20 and the container body 18 is not limited to an o-ring, however, and may be a gasket.

As shown in FIG. 1, the container body 18 and the container lid 20 are coupled together by the band coupling 10. The band coupling 10 is detachable with respect to the container 12, and serves to mutually couple the container body 18 and the container lid 20 by clamping together the outer peripheries of the first flange section 19 and the second flange section 21. Upon tightening the band coupling 10, the container lid 20 and the container body 18 are fixed firmly to each other, thereby closing and hermetically sealing the container 12.

An air release valve 24 for zeroing out the inner pressure when the container 12 is opened to perform maintenance thereon and the like is disposed on the top of the container lid 20.

A filter element (not shown) for removing foreign matter (solid components) from a liquid to be processed is arranged in the interior of the container body 18. The liquid to be processed is a liquid having foreign matter such as solid components or the like mixed therein, for example, a coolant liquid, a cleaning solvent, cutting oil, water for industrial use, or the like. The object on which processing is carried out is not limited to a liquid, but may be a gas contaminated with foreign matter.

An inlet port 26 into which the liquid to be processed is introduced is disposed so as to project on an upper side on the outer circumferential surface of the container body 18. A discharge port 28 for discharging the processed liquid is disposed so as to project on a lower side on the outer circumferential surface of the container body 18. The filter element is arranged in the interior of the container 12 on a liquid flow path between the inlet port 26 and the discharge port 28.

A liquid removal port 30 for discharging liquid that has accumulated inside the container 12 when maintenance is carried out thereon is further provided on a lower part of the container body 18. Dedicated tubes (not shown) are connected respectively to the inlet port 26, the discharge port 28, and the liquid removal port 30.

On the container body 18 there are further provided a first pressure gauge 25 for measuring the pressure of the fluid prior to passing through the filter element, and a second pressure gauge 27 for measuring the pressure of the fluid after having passed through the filter element.

In the filter 14, which is constructed in the foregoing manner, a liquid to be processed that contains foreign matter (solid components) therein is introduced into the interior of the container 12 through the inlet port 26, and solid/liquid separation is carried out as a result of the foreign matter being captured by the filter element. Stated otherwise, the liquid is filtered, whereby foreign matter in the liquid is removed. In addition, the liquid having been filtered by the filter element is discharged to the exterior through the discharge port 28.

Figure 3:
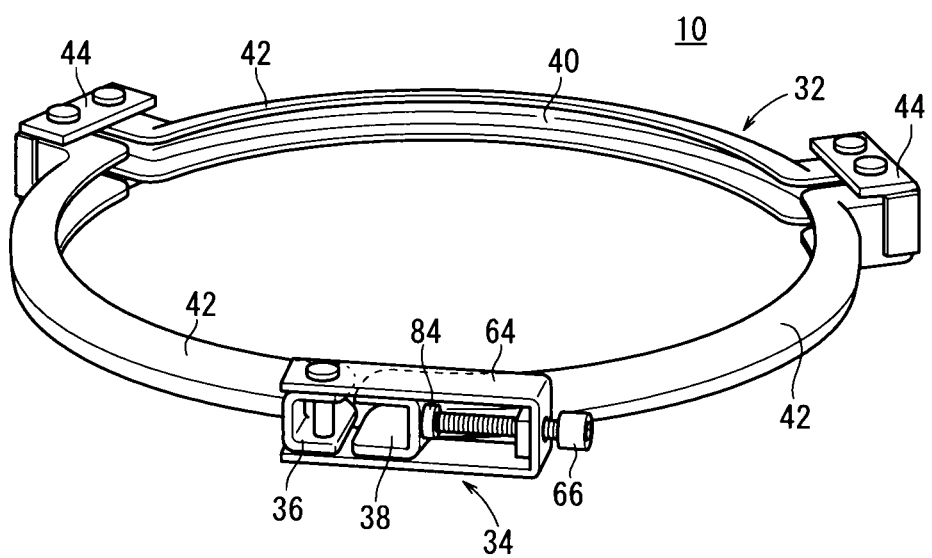
FIG. 3 is an overall perspective view of the band coupling according to the embodiment of the present invention.

FIG. 3 is an overall perspective view of the band coupling 10 according to the embodiment of the present invention. As shown in FIG. 3, the band coupling 10 comprises a retainer 32 that surrounds substantially once the peripheries of the first flange section 19 and the second flange section 21 and which is capable of being fitted together with the first flange section 19 and the second flange section 21, and a tightening mechanism 34 for tightening the retainer 32.

The retainer 32 includes a first end section 36 of one end thereof, and a second end section 38 of another end thereof, such that when installed on the container 12, the retainer 32 exhibits an annular shape overall. A fitting groove 40 for being fitted to the first flange section 19 and the second flange section 21 is formed on the inner circumference of the retainer 32. For this purpose, the cross sectional shape of the retainer 32 is of a V-shape or a U-shape (see FIG. 2).

In the present embodiment, the retainer 32 includes plural arcuate retainer segments 42, and connecting members 44 that connect ends of the plural retainer segments 42 in a rotatable manner. In the illustrated example, two connecting members 44 are arranged between three retainer segments 42. However, the number of retainer segments 42 may be two, or four or greater, in which case, the connecting members 44 are disposed in a number that is one less than the number of retainer segments 42. The material of the retainer segments 42 is not particularly limited, and may be, for example, stainless steel, an aluminum alloy, a copper alloy, or the like.

Figure 4:
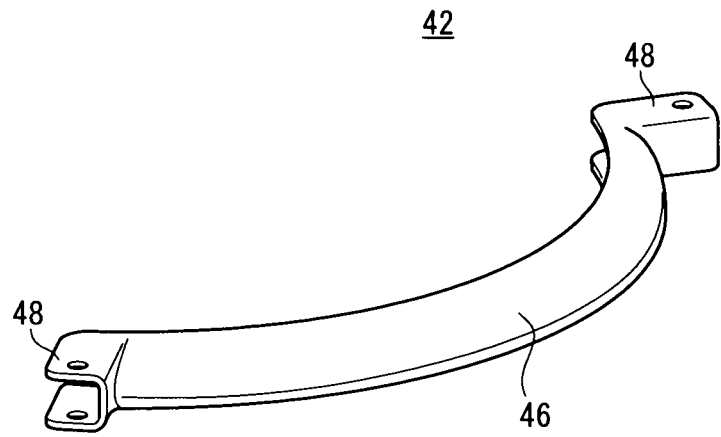
FIG. 4 is a perspective view of a retainer segment of the band coupling according to the embodiment of the present invention.

As shown in FIG. 4, the retainer segment 42 includes an arcuate portion 46 having the fitting groove 40 (see FIGS. 2 and 3) that is fitted onto the first flange section 19 and the second flange section 21 and which extends in an arcuate shape, and projecting end portions 48, which are bent outwardly and project from both ends of the arcuate portion 46. The arcuate portion 46 is set to a shape that enables it to be fitted onto the outer peripheries of the first flange section 19 and the second flange section 21. The cross sectional shape of the projecting end portions 48 is of a gate-like shape in the illustrated example, but may be a U-shape or a V-shape in cross section as well.

Figure 5:
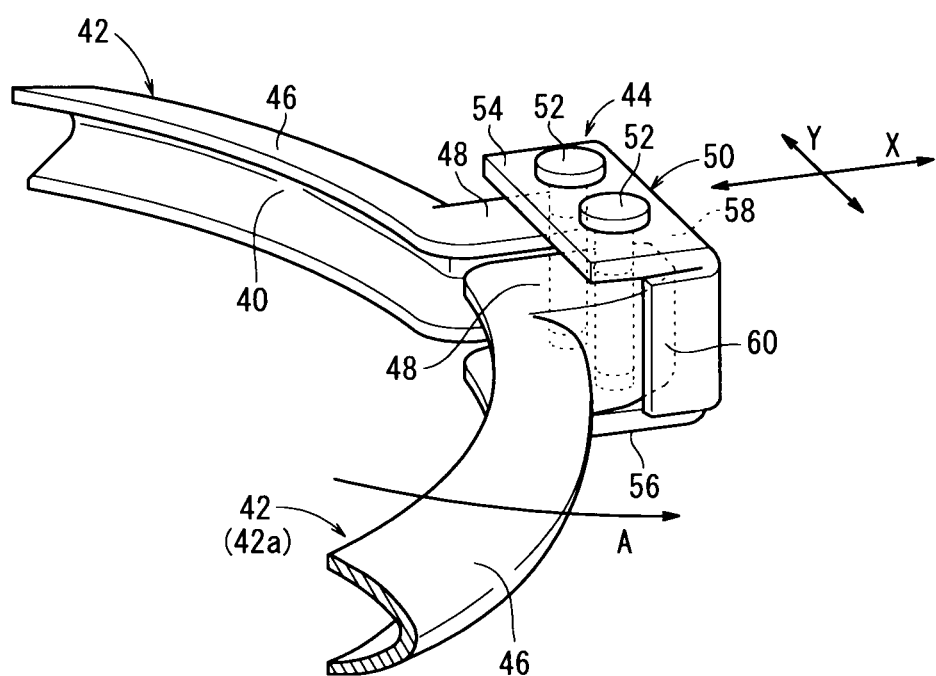
FIG. 5 is a perspective view with partial omission showing a connecting member of the band coupling and the surrounding vicinity thereof according to the embodiment of the present invention.

FIG. 5 is a perspective view with partial omission showing the connecting member 44 of the band coupling 10 and the surrounding vicinity thereof according to the embodiment of the present invention. As shown in FIG. 5, the connecting member 44 includes a connector body 50 and pins 52. The connector body 50 includes an upper end plate 54 that covers in common upper surfaces of respective projecting end portions 48 of two retainer segments 42, a lower end plate 56 that covers in common lower surfaces of the respective projecting end portions 48 of the two retainer segments 42, and a connecting plate 58 that connects the upper end plate 54 and the lower end plate 56. Preferably, the upper end plate 54, the connecting plate 58, and the lower end plate 56 are consecutive members.

On respective sides of one and the other side in the widthwise direction of the connecting member 44 (the direction of the arrow Y in FIG. 5), pins 52 are inserted through the upper end plate 54, the projecting end portions 48, and the lower end plate 56. As a result, the connecting member 44 and the retainer segments 42 at both sides thereof are connected together in a rotatable manner. Because the retainer 32 is constructed in the foregoing manner, the angular interval of each of the retainer segments 42 can be expanded and contracted.

As shown in FIG. 5, stopper members 60, which regulate a range of rotation of the retainer segments 42, are further provided on the connecting member 44. The stopper members 60 of the illustrated example are plate-shaped bodies that extend in the X-direction from both ends of the connecting plate 58, thereby at least partially closing both ends (i.e., ends in the Y-direction) of the connecting member 44 (connector body 50).

In the illustrated example, although the stopper members 60 and the connecting plate 58 are formed from a contiguous integral member, separately fabricated components may also be joined together by a suitable joining means (e.g., by welding or the like). Further, the stopper members 60 may be formed as integral members contiguous with the upper end plate 54 and the lower end plate 56, or alternatively, components fabricated separately from the upper end plate 54 and the lower end plate 56 may be joined thereto by a suitable joining means.

Because the stopper members 60, which are constructed as described above, are provided on the connecting members 44, the range of rotation of the retainer segments 42, and in particular, the range of rotation thereof in the opening direction of the retainer 32, is regulated. More specifically, assuming that the frontward illustrated retainer segment 42 in FIG. 5, in particular, is designated and described by the reference numeral 42a, when the retainer segment 42a is rotated from the condition in FIG. 5 by a certain degree in the A-direction, the projecting end portion 48 (or a region in the vicinity of the border between the projecting end portion 48 and the arcuate portion 46) of the retainer segment 42a comes into abutment against the stopper member 60 of the connecting member 44, and therefore at this position, rotation of the retainer segment 42a in the A-direction is restricted. The range of rotation is restricted similarly concerning the other retainer segments 42 apart from the retainer segment 42a.

Further, the stopper members 60 may also extend by a degree in the X-direction sufficient to completely close both ends of the connecting member 44 (connector body 50), although in the case that both ends of the connecting member 44 are completely closed, the range of rotation of the retainer segments 42 becomes narrow. For this reason, the range within which the stopper members 60 are disposed should be determined taking into consideration the necessary maximum rotational positions of the retainer segments 42.

Figure 6A:
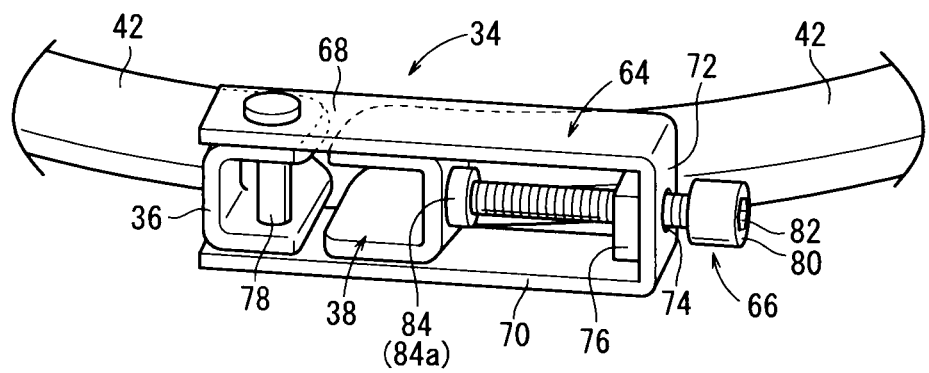
FIG. 6A is a perspective view with partial omission showing a tightening mechanism of the band coupling and the surrounding vicinity thereof according to the embodiment of the present invention.
Figure 6B:
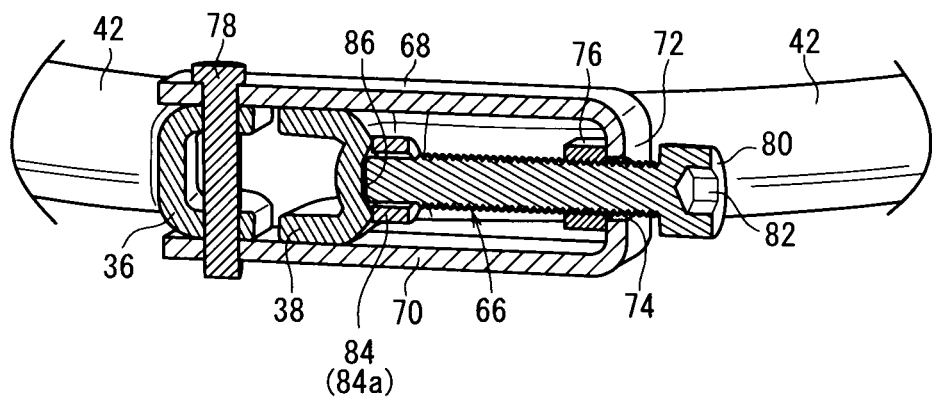
FIG. 6B is a perspective view with partial omission showing a cross section of the tightening mechanism of the band coupling and the surrounding vicinity thereof according to the embodiment of the present invention.

FIG. 6A is a perspective view with partial omission showing the tightening mechanism 34 of the band coupling 10 and the surrounding vicinity thereof. FIG. 6B is a perspective view with partial omission showing a cross section of the tightening mechanism 34 of the band coupling 10 and the surrounding vicinity thereof. As shown in FIGS. 6A and 6B, the tightening mechanism 34 includes a stopper 64 and a pressing bolt 66.

The stopper 64 is attached rotatably to the first end section 36 of the retainer 32. The stopper 64 of the illustrated example is a gate-shaped component having an upper plate 68 positioned on an upper side of the first end section 36 of the retainer 32, a lower plate 70 positioned on a lower side of the first end section 36 of the retainer 32, and a connecting plate 72 that interconnects the upper plate 68 and the lower plate 70. The interval between the upper plate 68 and the lower plate 70 is set to be roughly the same or slightly greater than the width in the heightwise direction of the first end section 36 and the second end section 38.

A through hole 74 through which the pressing bolt 66 is inserted is bored through the connecting plate 72. A nut 76 is fixed onto a backside surface thereof (i.e., a surface on the inner side of the stopper 64) of the connecting plate 72. The nut 76 may also be fixed to a front surface (i.e., a surface on the outer side of the stopper 64) of the connecting plate 72. Further, in the case that the wall thickness of the connecting plate 72 is of a degree that enables threads to be provided therein, the nut 76 may be dispensed with, and in its place, female screw threads may be provided in the connecting plate 72 itself.

At one end thereof through which a pin 78 is inserted, the stopper 64 is connected rotatably to the first end section 36 of the retainer 32. Because the stopper 64 is constructed in this manner, by rotating the stopper 64, either one of a condition in which the stopper 64 is separated from the second end section 38 of the retainer 32, or a condition in which the second end section 38 of the retainer 32 is accommodated in the stopper 64 (i.e., the state shown in FIG. 6A) can be obtained.

The pressing bolt 66 is configured so as to be capable of being inserted in the through hole 74 of the stopper 64, and of being screw-engaged with the nut 76 of the stopper 64. Accordingly, the pressing bolt 66 is screw-engaged so that advancement and retraction thereof can be adjusted with respect to the stopper 64. A head portion 80 of the pressing bolt 66 is formed with a hexagonal hole 82 therein to enable insertion therein of a hexagonal wrench, i.e., an Allen wrench, for rotating the pressing bolt 66. Alternatively, the head portion 80 of the pressing bolt 66 may simply be a hexagon bolt formed in the shape of a hexagonal cylinder.

In the tightening mechanism 34 constructed in the foregoing manner, in a state in which the retainer 32 is fitted onto the first flange section 19 and the second flange section 21, and the second end section 38 is accommodated in the stopper 64, when the pressing bolt 66 is advanced into the stopper 64 while rotating the pressing bolt 66, the second end section 38 is pressed by the tip end of the pressing bolt 66 toward the side of the first end section 36.

As shown in FIGS. 6A and 6B, on the second end section 38 of the retainer 32, a projection 84 is provided, which is caught on the pressing bolt 66 when the pressing bolt 66 presses the second end section 38. The projection 84 of the illustrated example is configured as a hollow tubular member 84a. As shown in FIG. 6A, the hollow tubular member 84a may be formed in a hollow cylindrical shape. The hollow part of the hollow tubular member 84a is of a size sufficient to enable insertion therein of the tip end of the pressing bolt 66, and is set to be the same or slightly greater than the outer diameter of the tip end of the pressing bolt 66. Further, a shallow recessed cavity 86 is formed at a location of the second end section 38 of the retainer 32, which is pressed by the pressing bolt 66.

The hollow tubular member 84a is not limited to a hollow cylindrical shape, but may be of any hollow tubular shape (e.g., a hollow square tubular shape) that enables the tip end of the pressing bolt 66 to be inserted therein. Further, the projection 84 is not limited to a hollow tubular shape, but may be of any shape that prevents the stopper 64 from being rotated in a direction away from the second end section 38, as a result of projecting from an exterior wall surface of the second end section 38 and coming into abutment against a side surface (i.e., a side surface in a direction where the stopper 64 is separated from the second end section 38) of the tip end of the pressing bolt 66.

The band coupling 10 according to the present embodiment is constructed basically as described above. Next, operations and advantages of the band coupling 10 will be described.

In the case that the container body 18 and the container lid 20 of the container 12 are to be coupled by the band coupling 10, in a state in which the first end section 36 and the second end section 38 of the retainer 32 are separated from each other, the retainer 32 is expanded or widened sufficiently. At this time, as a result of the range of rotation of the retainer segments 42 being restricted by the stopper members 60, the retainer 32 cannot be opened excessively. Owing thereto, handling is simplified and ease of use is improved. Further, as discussed above, the stopper members 60 are disposed so as to cover ends (projecting end portions 48) of the retainer segments 42, and therefore any gaps between the ends of the retainer segments 42 and the connecting members 44 are made narrow by the stopper members 60, whereby penetration of the user's fingers into such gaps can be prevented, and thus the user can handle the band coupling 10 safely.

Next, in a state in which the upper opening of the container body 18 is closed by the container lid 20, the fitting groove 40 of the retainer 32 is fitted over the first flange section 19 and the second flange section 21, whereby the band coupling 10 is installed on the outer circumference of the container 12. In this case, each of the retainer segments 42 is connected rotatably through the connecting members 44, and therefore, the retainer 32 can be widened easily with a small force. For this reason, installation of the band coupling 10 onto the container 12 is easy to perform.

After the band coupling 10 has been installed on the outer circumference of the container 12, by tightening the retainer 32 using the tightening mechanism 34, the first flange section 19 and the second flange section 21 are pressed firmly by the retainer 32, and the container body 18 and the container lid 20 are coupled together mutually. At this time, the tightening mechanism 34 is operated in the following manner.

More specifically, the pressing bolt 66 is loosened up to a suitable position, so that the stopper 64 can be rotated and moved to a position at which the second end section 38 is accommodated in the stopper 64. In this case, if necessary, the pressing bolt 66 may be loosened maximally, or the pressing bolt 66 may be detached from the stopper 64. Next, by rotating the stopper 64, the second end section 38 is moved into a position on the inner side of the stopper 64.

Next, by rotating the pressing bolt 66, the pressing bolt 66 is moved in a direction to advance into the interior of the stopper 64, whereby the tip end of the pressing bolt 66 presses the second end section 38 toward the side of the first end section 36. When this is done, the first end section 36 and the second end section 38 are drawn mutually toward each other, and the retainer 32 is tightened thereby. When the retainer 32 is sufficiently tightened, a tightening operation by the pressing bolt 66 is finished. In this case, so that the position of the pressing bolt 66 at which an optimal amount of tightening is achieved can be comprehended, a marking may be placed on the pressing bolt 66, or alternatively, the length of the pressing bolt 66 may be set so that an optimal tightening amount is achieved at a point in time when the pressing bolt 66 is inserted maximally into the stopper 64.

By carrying out the above operations, the container body 18 and the container lid 20 are firmly coupled to each other by the band coupling 10. Thereafter, when a predetermined process is carried out in the interior of the container 12, a high pressure is brought about inside the container 12. With the present embodiment, because the container 12 is configured as a filter container, liquid, which forms an object on which filtration is to be performed in the interior of the high-pressure container 12, is introduced from the inlet port 26, the liquid is filtered by the filter element, and then the filtered liquid is discharged from the discharge port 28.

Next, the following operations are carried out when the band coupling 10, which has been installed in the foregoing manner, is to be removed. First, because the interior of the pressure container is under high pressure, the air release valve 24 is operated to open the container 12 to atmosphere.

Figure 7A:
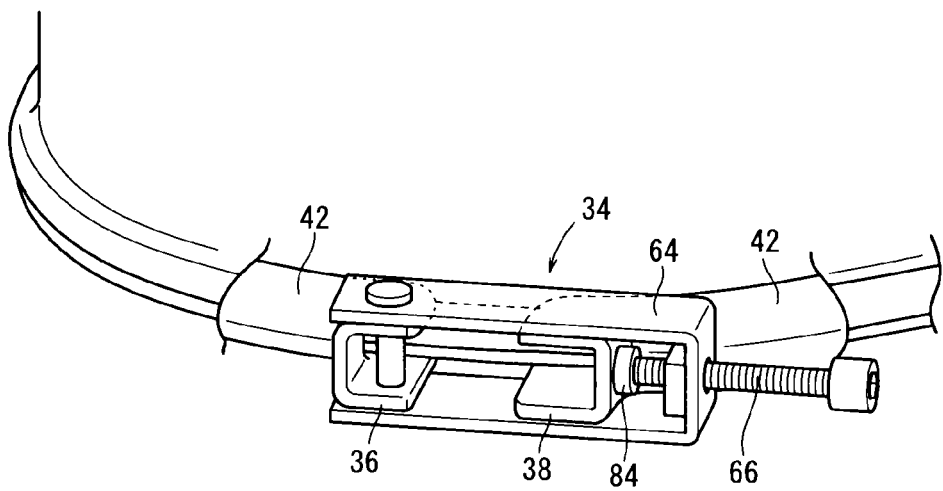
FIG. 7A is a perspective view with partial omission showing a midway-loosened state of a pressing bolt of the band coupling according to the embodiment of the present invention.

Then, by rotating and loosening the pressing bolt 66, the pressing bolt 66 moves in a direction away from the stopper 64. When this is done, accompanying movement of the pressing bolt 66, the second end section 38 is moved in a direction to separate from the first end section 36. FIG. 7A shows a midway-loosened state of the pressing bolt 66, whereas FIG. 7B shows the pressing bolt 66 in a completely loosened state.

Figure 7B:
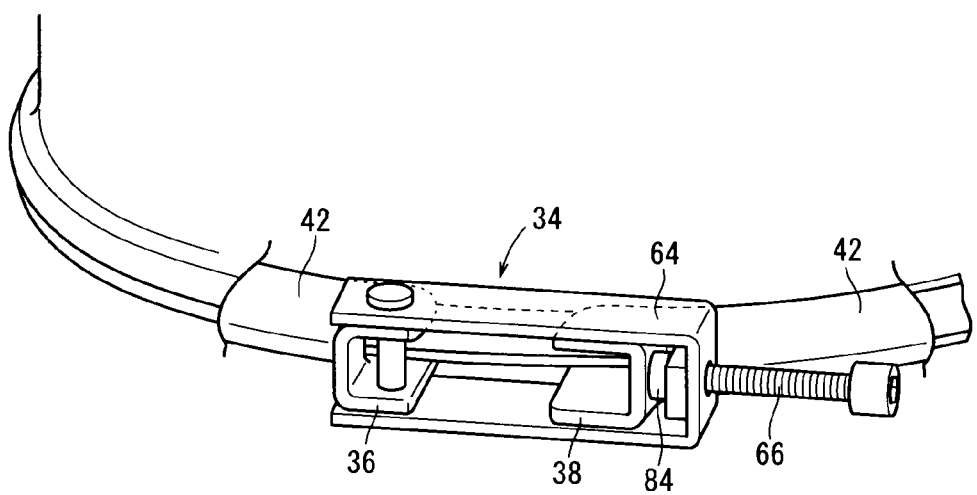
FIG. 7B is a perspective view with partial omission showing a completely loosened state of the pressing bolt of the band coupling according to the embodiment of the present invention.

In this case, because the projection 84 (the hollow tubular member 84a) is provided on the second end section 38 of the retainer 32, even if the pressing bolt 66 is loosened to a midway position as shown in FIG. 7A, engagement between the pressing bolt 66 and the second end section 38 is not released, whereas as shown in FIG. 7B, at a stage in which the pressing bolt 66 is completely loosened, engagement between the pressing bolt 66 and the second end section 38 is released.

In this manner, even if the pressing bolt 66 is loosened to a midway position, because the pressing bolt 66 remains caught on the projection 84, even if it is forgotten to release the high pressure from the interior of the container 12, the stopper 64 does not become detached from the second end section 38. In addition, even if it is forgotten to release the high pressure from the interior of the container 12, at a stage at which the pressing bolt 66 is completely loosened, the hermetically sealed condition between the container body 18 and the container lid 20 has already been released, and a state occurs in which the internal pressure in the container 12 has escaped. Therefore, rising up of the container lid 20, or falling off of the band coupling 10 at an unintended timing, can be prevented.

As shown in FIG. 7B, once the pressing bolt 66 has been completely loosened, the stopper 64 is moved in a direction away from the second end section 38, the first end section 36 and the second end section 38 of the retainer 32 are placed in a fully free condition, and the retainer 32 is widened, whereupon the band coupling 10 is detached from the container 12. In this case, because the respective retainer segments 42 are connected rotatably through the connecting members 44, the retainer 32 can easily be widened with a small force. Owing thereto, removal of the band coupling 10 is easy.

For demonstrating the superiority of the present invention, effects of the present invention shall be described in comparison with various comparative examples.

Figure 8:
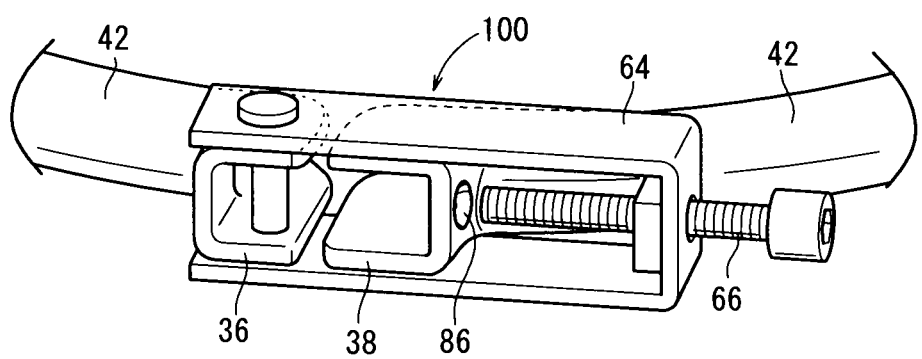
FIG. 8 is a perspective view with partial omission of a tightening mechanism of a band coupling and the surrounding vicinity thereof according to a first comparative example.

FIG. 8 is a perspective view with partial omission of a tightening mechanism 100 and surrounding vicinity according to a first comparative example. The tightening mechanism 100 according to the first comparative example includes a structure in which the projection 84 is omitted from the tightening mechanism 34 of the band coupling 10 according to the present embodiment. Since configurations of other parts are the same as in the tightening mechanism 34, such parts that are in common with the tightening mechanism 34 are designated using the same reference characters, and detailed explanations of such features are omitted.

Figure 9A:
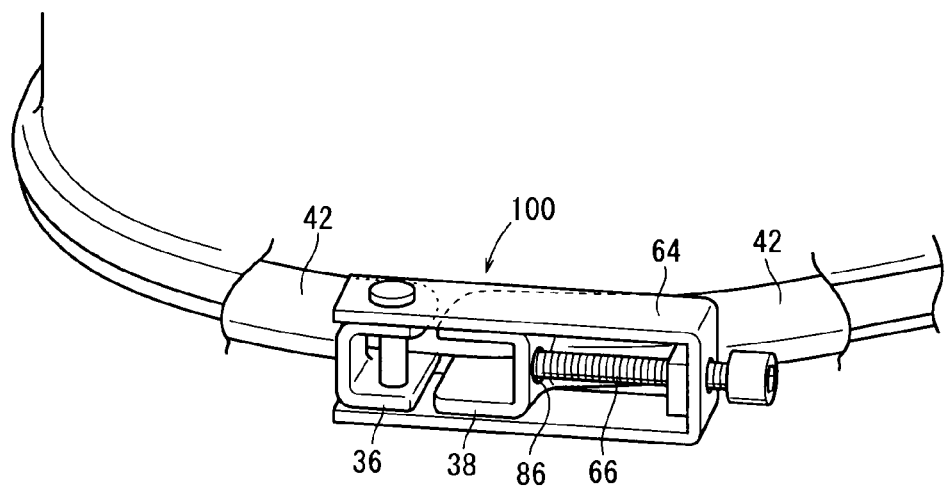
FIG. 9A is a perspective view with partial omission showing a midway-loosened state of a pressing bolt of the band coupling according to the first comparative example.
Figure 9B:
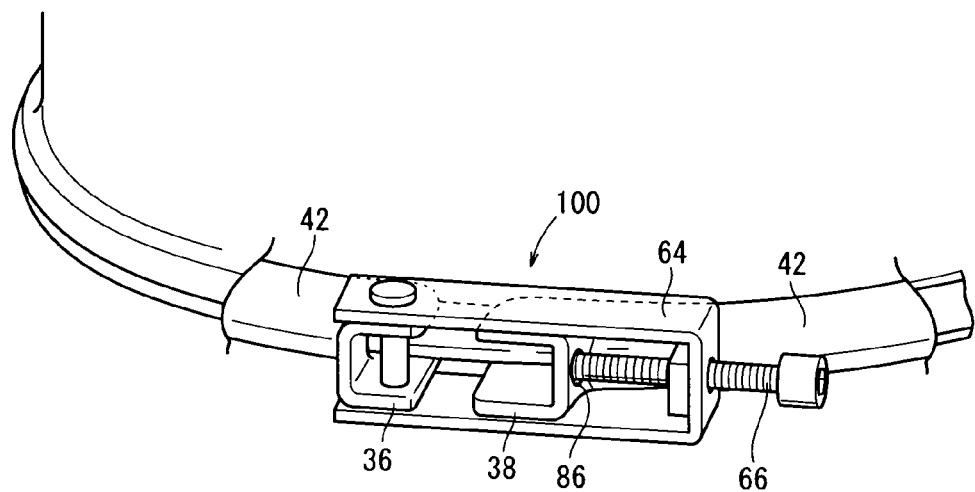
FIG. 9B is a perspective view with partial omission showing a substantially maximum loosened state of the pressing bolt of the band coupling according to the first comparative example.

As shown in FIG. 9A, in the case of the tightening mechanism 100, in a condition in which the pressing bolt 66 is advanced sufficiently and the retainer 32 is sufficiently tightened, since the tip end of the pressing bolt 66 is caught in the cavity 86, even though the cavity 86 is shallow, the stopper 64 does not become detached from the second end section 38. However, supposing that the pressing bolt 66 is loosened in a condition where it is forgotten to release the high pressure from the interior of the container 12, then as shown in FIG. 9B, the tightening force of the retainer 32 becomes weakened due to movement of the pressing bolt 66 in the loosening direction, and when the pressing force of the pressing bolt 66 with respect to the second end section 38 is lowered, because the degree at which the pressing bolt 66 is caught on the cavity 86 is shallow, or stated otherwise, because the retaining force of the pressing bolt 66 by the cavity 86 is weak, it becomes possible for the stopper 64 to separate away from the second end section 38. In this case, there is a possibility for the container lid 20 to rise, or for the band to fall off at an unintended timing.

In contrast thereto, with the band coupling 10 according to the present embodiment, as noted above, because the projection 84 is provided on the second end section 38 of the retainer 32, even if the pressing bolt 66 is loosened to a midway position, the stopper 64 does not become detached from the second end section 38, and consequently, lifting up of the container lid 20, or falling off of the band at an unintended timing is prevented.

Figure 10:
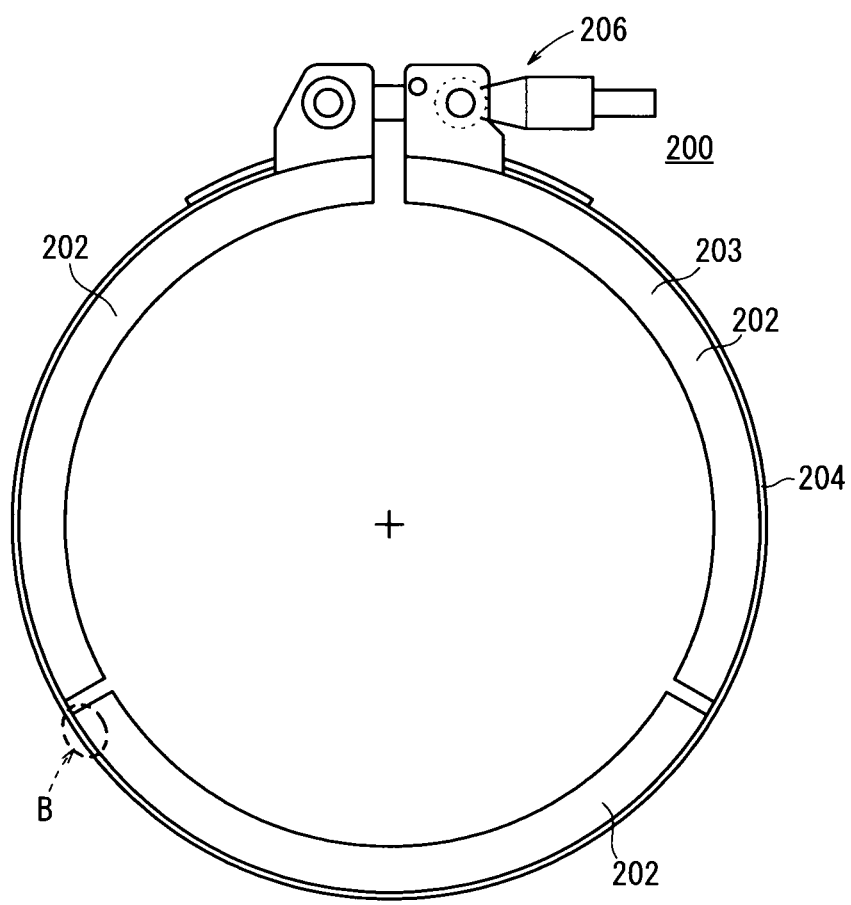
FIG. 10 is an overall plan view of a band coupling according to a second comparative example.

FIG. 10 is an overall plan view of a band coupling 200 according to a second comparative example. As shown in FIG. 10, the band coupling 200 includes an annular retainer 203 made up from plural retainer pieces 202, a band 204 that is attached to an outer circumference of the retainer 203, and a tightening mechanism 206 for tightening the band 204.

Figure 11:
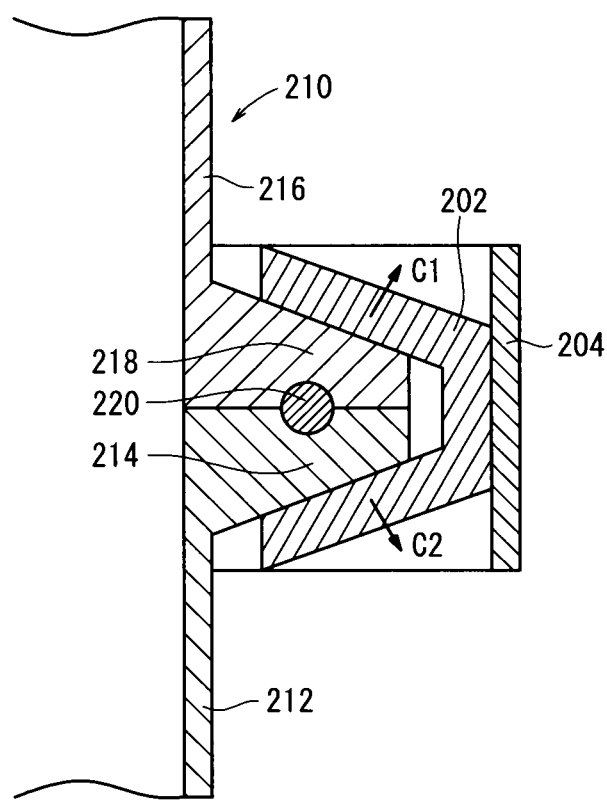
FIG. 11 is a cross sectional view with partial omission of the band coupling and the surrounding vicinity thereof when the band coupling according to the second comparative example is installed on a pressure container.

FIG. 11 is a cross sectional view with partial omission of the band coupling 200 and the surrounding vicinity thereof when the band coupling 200 is installed on a pressure container 210. As shown in FIG. 11, an o-ring 220 is interposed between a container side flange section 214 provided on an upper end of a container body 212 of the pressure container 210, and a lid side flange section 218 provided on a lower end of a container lid 216, with the retainer pieces 202 being fitted onto outer peripheries of the container side flange section 214 and the lid side flange section 218.

In this manner, the retainer pieces 202 are fitted onto the container side flange section 214 and the lid side flange section 218, and both flange sections are clamped together firmly. In this state, loads are imposed directly on the retainer pieces 202 from the container side flange section 214 and the lid side flange section 218. In this case, because forces act on the retainer pieces 202 in the directions of the arrows C1 and C2 in FIG. 11, the retainer pieces 202 are deformed so as to open upwardly and downwardly.

In addition, along with repeated use of the band coupling 200, due to such deformation occurring repeatedly, if cracking due to fatigue occurs at the outer circumference of the retainer pieces 202, and in particular, at ends thereof (e.g., at part B shown in FIG. 10), such cracking tends to progress, and there is a possibility that the retainer pieces 202 will suffer from breakage.

In contrast thereto, as shown in FIG. 4, each of the retainer segments 42 of the band coupling 10 according to the present embodiment is made up from the arcuate portion 46, and projecting end portions 48 that project from both ends of the arcuate portion 46. In accordance with this structure, in a condition in which the retainer 32 is fitted onto the first flange section 19 and the second flange section 21, the arcuate portion 46, which contacts the first flange section 19 and the second flange section 21, is subjected to a load directly from the first flange section 19 and the second flange section 21. However, the projecting end portions 48 project radially outward from the arcuate portion 46, and thus are not in contact with the first flange section 19 and the second flange section 21. Since the projecting end portions 48 are not subjected to loads directly from the first flange section 19 and the second flange section 21, and elastic deformation does not occur therein, cracking due to fatigue does not occur.

Owing thereto, even if some cracking due to fatigue occurs provisionally in the arcuate portion 46, because the location at which cracking occurs is not at the ends of the retainer segments 42, such cracking does not progress. More specifically, the strength of the retainer 32, which is configured by the retainer segments 42, can be enhanced. Accordingly, the retainer segments 42 can be made more thin-walled, and as a result, manufacturing costs can be reduced. Further, due to a reduction in overall weight of the band coupling 10 as a result of making the retainer segments 42 thin-walled, handling of the band coupling 10 is facilitated, and ease of use is further improved.

A preferred embodiment of the present invention has been described above. However, the present invention is not limited to this embodiment, and it goes without saying that various modifications can be adopted without deviating from the essence and gist of the present invention.

The invention claimed is:

1. A band coupling for mutually coupling a container body having a first flange section and a container lid having a second flange section by clamping together outer peripheries of the first flange section and the second flange section, comprising:
   a retainer capable of surrounding substantially once around the outer peripheries of the first flange section and the second flange section, and of being fitted together with the first flange section and the second flange section; and
   a tightening mechanism for tightening the retainer;
   the retainer further comprising a first end section of one end to which the tightening mechanism is connected, and a second end section of another end, which is bent outward and opposes the first end section when the retainer is tightened;
   the tightening mechanism further comprising:
   a stopper that is attached rotatably to the first end section of the retainer;
   a pressing bolt that is screw-engaged with the stopper so as to be capable of advancing and retracting, and which presses the second end section toward a side of the first end section in a state in which the retainer is fitted to the first flange section and the second flange section, and
   a projection projecting from the second end section in a direction away from the first end section, to retain the pressing bolt when the pressing bolt presses the second end section,
   wherein the tightening mechanism further comprises a recessed cavity formed in a face of the second end section and recessed from the face of the second end section in a direction toward the first end section, and
   wherein the projection is a hollow tubular member surrounding the recessed cavity and wherein an inner periphery of the projection is not threaded, whereby the pressing bolt can be inserted in the projection without being screw-engaged with the projection in a state in which the second end section is pressed by the pressing bolt.

2. The band coupling according to claim 1, wherein the retainer includes plural arcuate retainer segments, and a connecting member for rotatably connecting together respective ends of the plural arcuate retainer segments.

3. The band coupling according to claim 2, wherein the connecting member includes stopper members that regulate a range of rotation of the retainer segments.

4. The band coupling according to claim 3, wherein the stopper members are disposed so as to cover ends of the retainer segments.

5. The band coupling according to claim 2, wherein each of the retainer segments includes an arcuate portion having a fitting groove that is fitted onto the first flange section and the second flange section and which extends in an arcuate shape, and projecting end portions, which are bent outwardly and project from both ends of the arcuate portion.

6. A pressure container comprising: a container body having
   a first flange section;
   a container lid having a second flange section; and
   the band coupling according to claim 1.

* * * * *